(12) United States Patent
Henry et al.

(10) Patent No.: US 10,628,987 B2
(45) Date of Patent: Apr. 21, 2020

(54) CONDENSED TRANSITIONS OF GRAPHICAL ELEMENTS PRESENTED IN GRAPHICAL USER INTERFACES

(71) Applicant: Google LLC, Mountain View, CA (US)

(72) Inventors: Eric Charles Henry, San Francisco, CA (US); Sharon Harris, Brooklyn, NY (US); Jonas Alon Naimark, San Francisco, CA (US); Brenton Alexander Simpson, San Francisco, CA (US); Ke Li, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/032,403

(22) Filed: Jul. 11, 2018

(65) Prior Publication Data

US 2019/0347842 A1 Nov. 14, 2019

Related U.S. Application Data

(60) Provisional application No. 62/668,678, filed on May 8, 2018.

(51) Int. Cl.
*G06T 13/80* (2011.01)
*G06F 9/451* (2018.01)
*G06F 3/0481* (2013.01)

(52) U.S. Cl.
CPC .......... *G06T 13/80* (2013.01); *G06F 3/04817* (2013.01); *G06F 9/451* (2018.02)

(58) Field of Classification Search
None
See application file for complete search history.

(56) References Cited

U.S. PATENT DOCUMENTS

| 6,369,830 | B1 * | 4/2002 | Brunner | G06T 15/40 |
| | | | | 345/619 |
| 6,549,218 | B1 * | 4/2003 | Gershony | G06F 9/451 |
| | | | | 715/781 |
| 7,068,288 | B1 * | 6/2006 | Good | G06F 3/0481 |
| | | | | 345/619 |

(Continued)

OTHER PUBLICATIONS

EP Extended European Search Report issued in European Application No. 18185500.8, dated Feb. 19, 2019, 8 pages.

*Primary Examiner* — Yongjia Pan
(74) *Attorney, Agent, or Firm* — Fish & Richardson P.C.

(57) ABSTRACT

Methods, systems, and apparatus, including computer programs encoded on a computer storage medium, for identifying a graphical user interface including a container having a first child element and a second child element; providing for display the container on the graphical user interface in a first state, the first state including display of the first child element, but not the second child element; applying a transition to the container to effectuate a state change of the container from the first state to a second state, the second state including display of the second child element, but not the first child element, applying the transition including applying a crossfade to the container to graphically fade the first child element to the second child element during application of the transition to the container; and after applying the transition, providing for display the container on the graphical user interface in the second state.

18 Claims, 6 Drawing Sheets

(56) References Cited

U.S. PATENT DOCUMENTS

| | | | | |
|---|---|---|---|---|
| 8,464,172 B2* | 6/2013 | Chaudhri | ............. | G06F 3/0481 |
| | | | | 715/764 |
| 8,495,514 B1* | 7/2013 | Ludolph | ............... | G06F 3/0481 |
| | | | | 715/768 |
| 8,621,393 B2* | 12/2013 | Chaudhri | ............. | G06F 3/0482 |
| | | | | 715/835 |
| 8,717,368 B1* | 5/2014 | Kopylov | ................ | G06T 13/80 |
| | | | | 345/419 |
| 9,552,131 B2* | 1/2017 | Chaudhri | ............. | G06F 3/0481 |
| 2004/0263426 A1* | 12/2004 | Endo | .................... | G06F 3/1431 |
| | | | | 345/2.2 |
| 2006/0294475 A1* | 12/2006 | Holecek | ............... | G06F 3/0481 |
| | | | | 715/781 |
| 2007/0288863 A1* | 12/2007 | Ording | ................ | G06F 3/0481 |
| | | | | 715/788 |
| 2008/0034314 A1* | 2/2008 | Louch | ...................... | G06F 8/60 |
| | | | | 715/778 |
| 2008/0120534 A1 | 5/2008 | Moore et al. | | |
| 2011/0161884 A1* | 6/2011 | Dugan | ................ | G06F 1/1626 |
| | | | | 715/843 |
| 2014/0089833 A1* | 3/2014 | Hwang | .............. | G06F 3/04817 |
| | | | | 715/769 |
| 2017/0140505 A1* | 5/2017 | Gueniot | ................ | G06T 13/80 |

* cited by examiner

CONDENSED TRANSITIONS OF GRAPHICAL ELEMENTS PRESENTED IN GRAPHICAL USER INTERFACES

CROSS-REFERENCE TO RELATED APPLICATIONS

This application claims the benefit under 35 U.S.C. § 119(e) of U.S. Patent Application No. 62/668,678, entitled "Condensed Transitions Of Graphical Elements Presented In Graphical User Interfaces," filed May 8, 2018, which is incorporated herein by reference in its entirety.

FIELD

The present specification relates to transitions of graphical elements presented on a graphical user interface.

BACKGROUND

In general, graphical user interfaces can present transitions between graphical elements as users interact with webpages or applications. That is, a presentation of a graphical element can be adjusted (graphically animated) to a differing presentation of the graphical element. Smooth transitions between such presentations provide ease of a user experience to help users understand the semantic relationships between the graphical elements, which makes software easier to use.

Transitions of graphical elements on a graphical user interface are difficult and time consuming to design and implement. Transitions often render at low frame rates on low end hardware causing a laggy and unpolished user experience.

SUMMARY

Innovative aspects of the subject matter described in this specification may be embodied in methods that include the actions of identifying a graphical user interface including a container having a first child element and a second child element; providing for display the container on the graphical user interface in a first state, the first state including display of the first child element, but not the second child element; applying a transition to the container to effectuate a state change of the container from the first state to a second state as the container moves within the graphical user interface, the second state including display of the second child element, but not the first child element, applying the transition including applying a crossfade to the container to graphically fade the first child element to the second child element as the container moves within the graphical user interface; and after applying the transition, providing the container for display within the graphical user interface in the second state.

Other embodiments of these aspects include corresponding systems, apparatus, and computer programs, configured to perform the actions of the methods, encoded on computer storage devices.

These and other embodiments may each optionally include one or more of the following features. For instance, applying the crossfade to the container to graphically fade the first child element to the second child element includes adjusting an opacity of the first child element and the second child element. Adjusting the opacity of the first child element and the second child element including decreasing the opacity of the first child element while concurrently increasing the opacity of the second child element during application of the crossfade. Application of the transition to the container includes maintaining the container in the first state while decreasing the opacity of the first child element. Application of the transition to the container includes maintaining the container in the second state while increasing the opacity of the second child element. Each child element is represented by a respective frame in the container and wherein applying the transition to the container includes replacing the frame in the container in the first state with the frame in the container in the second state through a change in opacity of the frames.

Particular implementations of the subject matter described in this specification can be implemented so as to realize one or more of the following advantages. For example, implementations of the subject matter provide for the efficient usage of computer resources by reducing the amount of frames that are rendered for display for transitions between graphical elements presented in interactive interfaces such as webpages. By reducing rendering of such animation sequences, the computer resources are reduced while concurrently providing a similar user experience. Specifically, by providing a condensed transition, the animation is provided faster and simpler while maintaining a visual resemblance of a direct transition—all while reducing the usage computing resource. More specifically, using the condensed transition does not require any processing to determine how each user interface element from a first state relates to a second user interface element in a second state because using the condensed transition eliminates the need to modify the user interface elements of the first state to arrive at the second state. Rather, the states of the condensed transition are independent of each other because the first state is faded out, followed by the second state faded in. This fading occurs as the container moves within user interface, thereby creating a visual effect that resembles that of the direct transition. In other words, the speed of the container movement combined with the crossfade results in a display that is perceived to be the same (or similar) to a direct transition. Furthermore, rendering of such condensed transitions, for example, by a mobile computing device with limited computer resources, is improved as the amount of rendering is reduced. Furthermore, in some situations, using a condensed transition can eliminate the need to perform interpolation techniques that are used to generate a large number of frames that morph the user interface elements from the first state to the user interface elements of the second state. Condensed transitions also enable transition between any two states independent of what user interface elements are included in each state because of the fact that the transition between the two states is performed independently of what user interface elements are presented in each state. Additionally, reducing the amount of work needed to perform a transition improves the frame rate, which improves the user experience by making the elements move more smoothly.

The details of one or more embodiments of the subject matter described in this specification are set forth in the accompanying drawings and the description below. Other potential features, aspects, and advantages of the subject matter will become apparent from the description, the drawings, and the claims.

DETAILED DESCRIPTION

Figure 1:
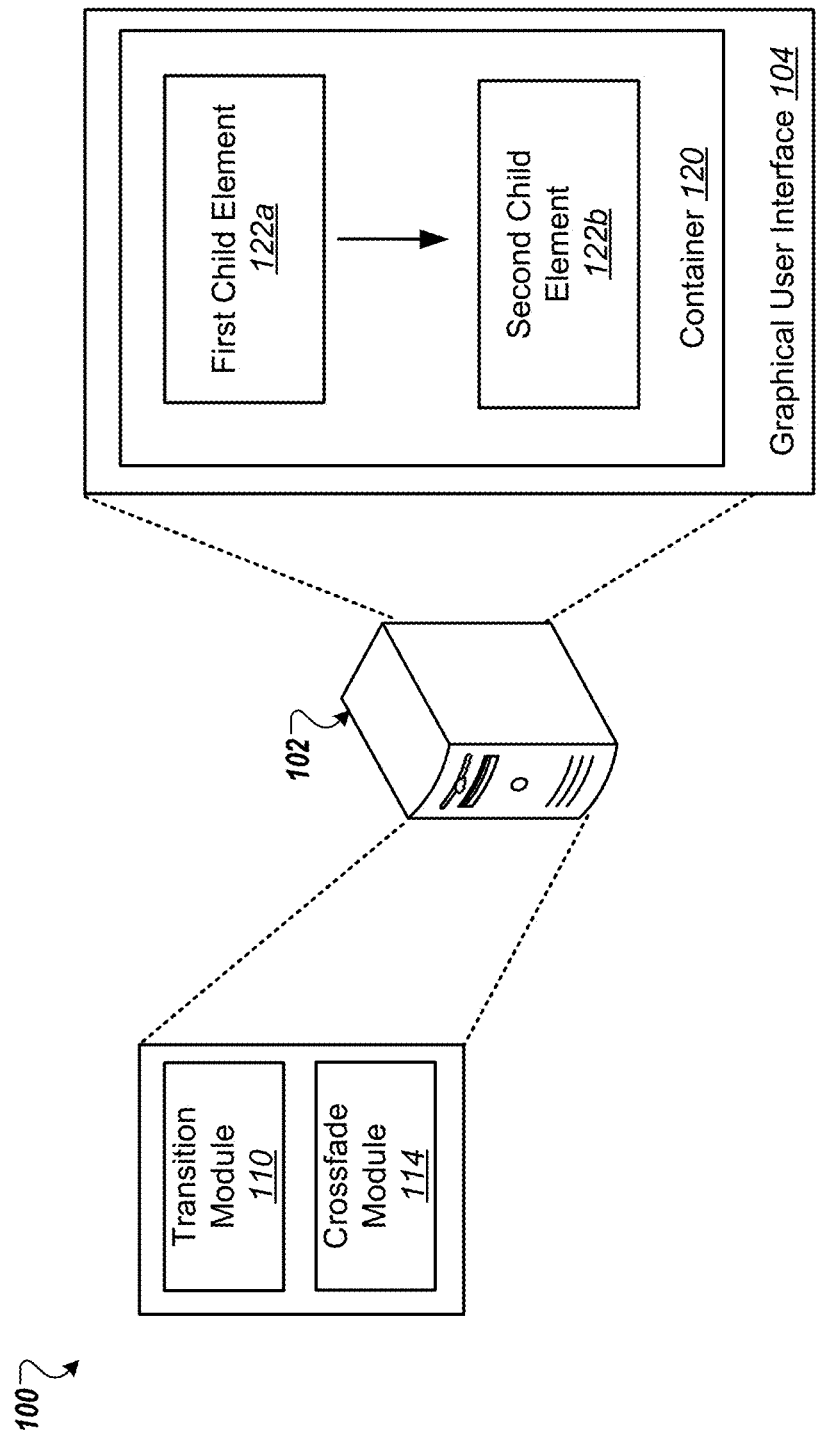
FIG. 1 depicts a system for providing a condensed transition of graphical elements of a graphical user interface (GUI).

According to aspects described herein, there are provided methods and systems implementing transitions in an automated manner, consuming less computational power, and/or providing a consistent design.

A system and method for providing a condensed transition of graphical elements that are presented on a graphical user interface (GUI) is described. Specifically, the GUI can include a container that includes child elements. Depending on the state of the container, a subset of the child elements are presented, and/or the child elements are presented with different visual characteristics (e.g., an opacity of the child elements). The child elements can include graphical elements that are presented, e.g., on a web page. Each of the child elements can be associated with a sequence of frames that are to be presented, and each can include a subset of the frames. In some examples, in an initial presentation of the GUI, the container is presented in a first state such that a first child element is presented for display, but a second child element is not presented. A transition can be applied to the container to change the state of the container to a second state. In some examples, in the subsequent presentation of the GUI, the container is presented in the second state such that the second child element is presented for display, but not the first child element. For example, the container is transitioned to display a sequence of frames in a desired order such that a visual transformation is presented on the GUI. Each of the states can include respective shapes and positions of the container, and elements of the container.

In some optional examples, certain frames are removed from the sequence of frames (e.g., relative to using a direct transition) such that a condensed transition of the container is provided for display on the GUI. For example, frames that would otherwise morph between two child elements in the middle of the sequence are not required to be presented. Removing the need to present the middle frames makes the condensed transition faster and simpler while maintaining a resemblance to a direct transition. The condensed transition is visually simpler and therefore easier for the hardware to render. In some optional cases, an empty frame can be inserted where one or more of the frames would have been located. A crossfade transition can be applied to the condensed transition of the container to graphically fade the first child element (and the frames associated with the first child element) to the second child element (and the frames associated with the second child element). For example, the frames prior to the removed frames are gradually decreased in opacity while the frames after the removed frames are gradually increased in opacity. The container is then provided for display in the second state—that is, display of the second child element but not the first child element. To that end, the visual perception of the condensed transition of the container (e.g., as viewed by a user viewing the container that is provided for display of the GUI) is visually similar to a direct transition. As described further herein, the condensed transition of the container from the first state to the second state, and the perceived movement of the child elements included by the container is similar to that of a visual perception of a direct transition of the container, while not requiring processing to determine how each user interface element of the second state can be derived from the user interface elements of the first state, as performed using a direct transition.

FIG. 1 depicts a system 100 for providing condensed transitions of graphical elements. The system 100 includes a computing device 102 that provides for display a graphical user interface (GUI) 104. The computing device 102 includes a transition module 110 and a crossfade module 114. Each of the transition module 110 and the crossfade module 114 can be a separate computing system, or a combination of computing systems. In some examples, each of the transition module 110 and the crossfade module can be implemented in a same set of physical hardware.

The graphical user interface 104 includes a container 120 having a first child element 122a and a second child element 122b (collectively referred to as child elements 122). In some examples, the container 120 defines a grouping of child elements 122 and relationships between the child elements 122. Transformations can be applied to the container 120 to adjust graphical properties of the child elements 122, described further herein. The child elements 122 are graphical depictions that can be presented within the GUI 104 based on a state of the container 120, described further herein. In some examples, the child elements 122 are agnostic and/or independent of each other. In some examples, the container 120 can include any number of child elements 122.

Figure 2:
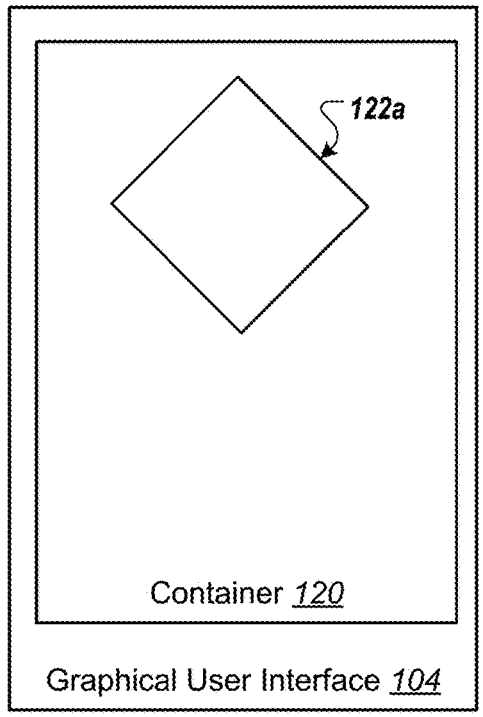
FIG. 2 depicts a container of the GUI in a first state.

In some implementations, as show in FIG. 2, the computing device 102 provides for display the container 120 in a first state, the first state including display of the first child element 122a, but not the second child element 122b. As illustrated, the first child element 122a includes a graphical depiction of a diamond-like shape; however, the first child element 122a can include any shape/object, any graphical depiction, or any graphical element that can be presented on the GUI 104. In some examples, when the container 120 is in the first state, the second child element 122b is hidden from display, or otherwise not available for presentation within the GUI 104.

Figure 3:
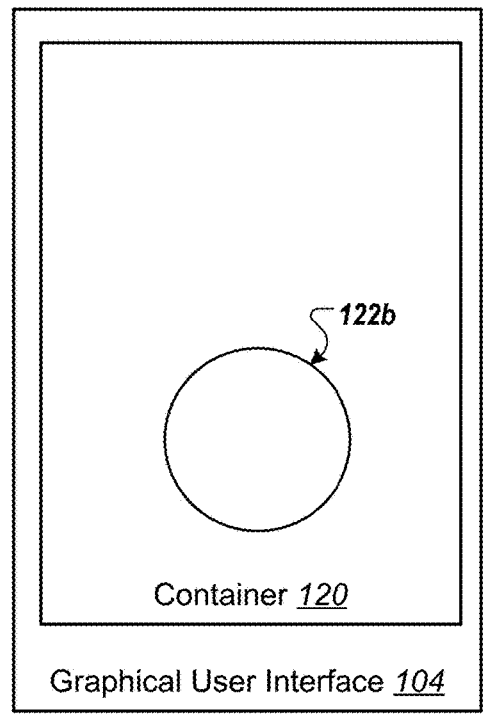
FIG. 3 depicts a container of the GUI in a second state.

In some implementations, the computing device 102, and in particular the transition module 110, applies a transition to the container 120 to effectuate a state change of the container 120 from the first state to a second state. In some examples, the second state includes display of the second child element 122b, but not the first child element 122a. For example, FIG. 3 illustrates the container 120 including display of the second child element 122b, but not the first child element 122a. As illustrated, the second child element 122b includes a graphical depiction of a circle-like shape; however, the second child element 122b can include any shape/object, any graphical depiction, or any graphical element that can presented on the GUI 104. In some examples, when the container 120 is in the second state, the first child element 122a is hidden from display, or otherwise not available for presentation within the GUI 104. In the illustrated example, the computing device 102 applies a transition to the container 120 to effectuate a state change of the container 120 from including the first child element 122a of the diamond-like shape and not including the second child element 122b (the first state) to including the second child element 122*b* of the circle-like shape and not including the first child element 122*a* (the second state).

Figure 4:
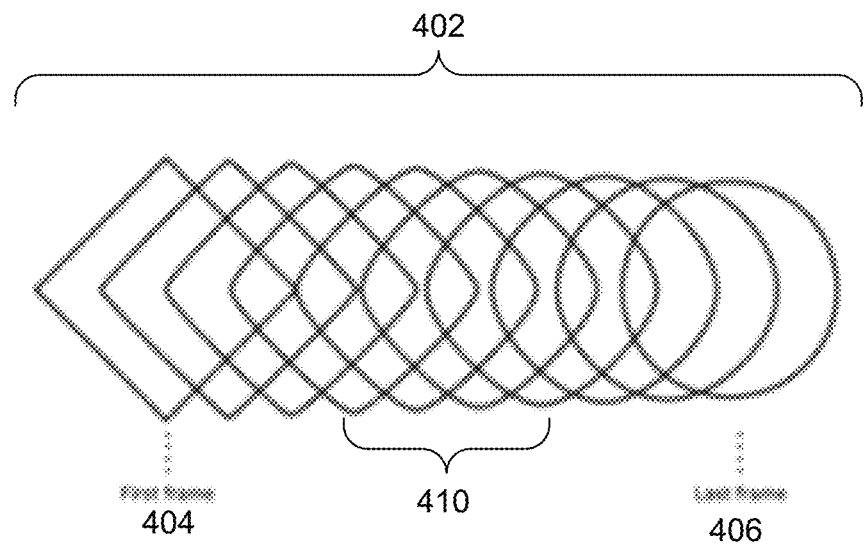
FIG. 4 is a graphical depiction of a direct transition of the child elements of the container.

FIG. 4 illustrates an approach of a transition between the first state and the second state of the container 120. Specifically, to apply the transition by the computing device 102 to the container 120, the computing device 102 uses a plurality of frames 402 that are included in the transition of the container 120 from the first state to the second state. In the illustrated example, the plurality of frames 402 represent a 10-frame (direct) transition (animation) of the first child element 122*a* (diamond-like shape) to the second child element 122*b* (circle-like shape). The plurality of frames 402 represent a sequence of frames that are displayed in a particular sequence, e.g., from a first frame 404 to a last frame 406. In the illustrated example, the plurality of frames 402 are displayed in a sequence from left-to-right; however, any display sequence of the plurality of frames 402 is possible depending on the application desired. In particular, the container 120 can be transitioned from the first state to the second state by morphing (e.g., using the results of an interpolation process) the first child element 122*a* to the second child element 122*b*—presented as the plurality of frames 402 as the object of the frames 402 "moves" from the diamond-like shape to the circle-like shape.

To that end, in contrast to the interpolation process of FIG. 4 to transition the container 120 from the first state to the second state, the present disclosure applies a crossfade effect to the container 120, as the container 120 moves across the user interface, thereby creating the appearance of a direct transition, but without having to determine relationships between user interface elements of the first state and user interface elements of the second state. This limits and/or eliminates the need to perform morphing of the child elements of the container 120, and the associated interpolation required to perform the morphing. As described further herein, such crossfade transitions can be applied to multiple differing application scenarios, including crossfading of graphical elements graphical presented in webpages as well as other graphical elements presented in other situations. Furthermore, applying a crossfade effect to the container 120 as the container 120 moves within the user interface is computational more efficient than the conventional process of FIG. 4, as generating and presenting the results of interpolation between the first state and the second state of the container 120, which is more computationally demanding, can be avoided or limited. As mentioned above the child elements 122 are agnostic and/or independent of each other. Specifically, the first child element 122*a* can be agnostic of the second child element 122*b*, and further, of the state of the container 120. To that end, in a direct transition of the container 120, the relationship between each of the child elements that are presented in a first state and the child elements presented in the second state would need to be determined in order to transform the child elements between the two states. In other words, in a direct transition, a particular user interface element in the first state would need to be modified to arrive at a corresponding user interface element of the second state, thereby requiring processing to determine how that particular user interface element needs to be modified. However, utilizing a condensed transition of the container 120 provides the child elements and the states of the container 120 are independent of each other, thereby removing the need to perform processing to determine how to modify a user interface element of the first state to arrive at the corresponding user interface element of the second state.

Figure 5:
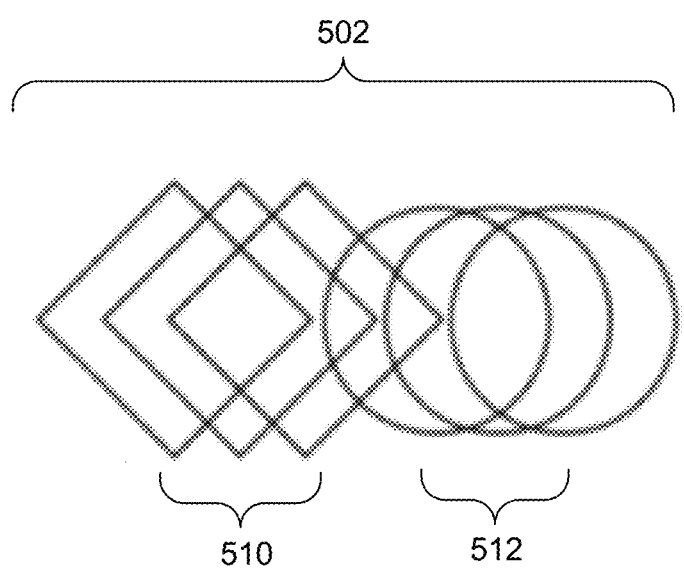
FIG. 5 is a graphical depiction of a condensed transition of the child elements of the container.

Referring to FIG. 5, furthermore, in some optional embodiments, to apply the transition by the computing device 102 to the container 120, the computing device 102 utilizes a condensed transition of the container 120, e.g., a condensed plurality of frames 502. Specifically, the computing device 102 performs a condensed transition that requires fewer frames relative to the plurality of frames 402 to transition the container 120 from the first state to the second state. The condensed plurality of frames 502 can be condensed relative to the transition of FIG. 4.

In some optional examples, the computing device 102 eliminates the need for or removes frames from the plurality of frames 402 that are positioned at a middle or center of the plurality of frames 402 to define the condensed plurality of frames 502. Specifically, while a container moves within the user interface, the computing device 102 can simply apply a crossfade to transition between two states (e.g., a beginning state and an end state) by varying the opacity of child elements that are subject to the transition, as discussed in more detail below. The combination of the movement of the container and the crossfade between the two states results in an animation that is visually perceived in a similar manner as a direct transition.

Alternatively, or additionally, the computing device 102 can convert an existing transition (e.g., that was generated using interpolation techniques and includes a number of different frames that morph between states), as illustrated by FIG. 4 into a condensed transition. For example, the computing device 102 can analyze the plurality of frames 402 and determine which frames are to be removed. The computing device 102 can identify the frames to be removed based on one our more characteristics, e.g., which removed frames provide for a smooth transition of the container 120 from the first state to the second state, which removed frames provide for the efficient usage of computer resources while still providing the condensed transition, etc. In the illustrated example, the computing device 102 can identify frames 410 for removal from the plurality of frames 402. The frames 410 can be positioned at a middle/center of the plurality of frames 402. That is, there is a similar or a same number of frames preceding the removed frames 410 as there are subsequent to the removed frames 410. However, any number of frames can be removed from any point of the transition.

In some optional examples, the condensed plurality of frames 502 (e.g., obtained by converting an existing transition to a condensed transition or obtained by creating a condensed transition between two states) includes a first subset 510 of frames and a second subset of frames 512. The first subset 510 of frames are prior to the removed frames 410 in the sequence and the second subset 512 are after the removed frames 410 in the sequence. In some examples, the first state of the container 120 includes the first subset 510 of frames and the second state of the container 120 includes the second subset 512 of frames. In the illustrated example, the first subset 510 of frames are associated with the diamond-like shape of the first state of the container 120 and the second subset 512 of frames are associated with the circle-like shape of the second state of the container 120.

Figure 6:
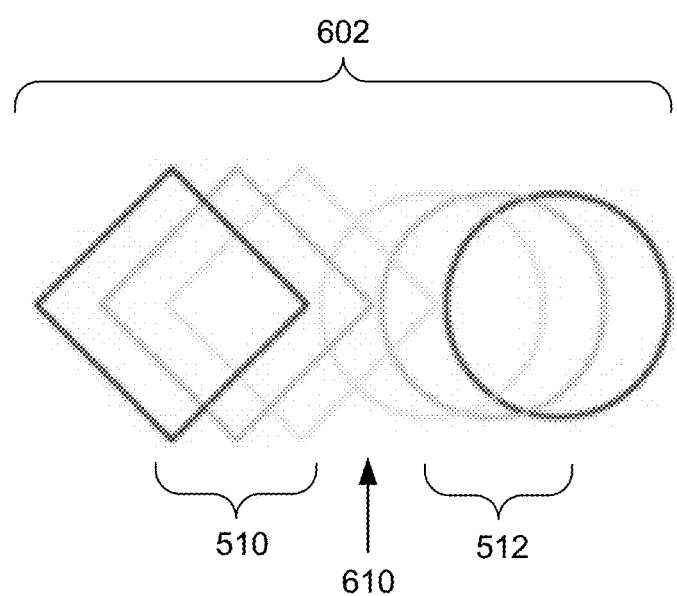
FIG. 6 is a graphical depiction of a crossfaded transition of the child elements of the container.

In some implementations, to apply the transition by the computing device 102 to the container 120, the computing device 102, and in particular, the crossfade module 114, applies a crossfade to the container 120 to graphically fade the first child element 122*a* to the second child element 122*b* during application of the condensed transition to the container 120. As illustrated in FIG. 6, the crossfade module 114 applies a crossfade to the container 120, and specifically, to the condensed plurality of frames 502 to define crossfaded frames 602. Specifically, the crossfade module 114 applies the crossfade to the container 120 by adjusting opacities of the first child element 122a and the second child element 122b as the container 120 moves. That is, the crossfade module 114 applies the crossfade to the container 120 by adjusting an opacity of the first subset of frames 510 included by the first child element 122a and the second subset of frames 512 included by the second child element 122b.

As illustrated in FIG. 6, the crossfade module 114 adjusts the opacity of the first child element 122a by decreasing the opacity of the first child element 122a, and specifically, the first subset of frames 510 included by the first child element 122a. In some examples, the frames of the first subset of frames 510 are gradually decreased in opacity such that each subsequent frame includes less opacity than a previous frame. Further, the crossfade module 114 adjusts the opacity of the second child element 122b by increasing the opacity of the second child element 122b, and specifically, the second subset of frames 512 included by the second child element 122b. In some examples, the frames of the second subset of frames 512 are gradually increased in opacity such that each subsequent frame includes more opacity than a previous frame. In some examples, the opacity of the first child element 122a (and the first subset of frames 510) is decreased concurrently with the opacity of the second child element 122b (and the second subset of frames 512) increasing.

In some examples, the crossfade module 114 decreases the opacity of the first child element 122a (and the first subset of frames 510) while maintaining the container 120 in the first state. That is, the GUI 104 includes display of the container 120 in the first state (e.g., display of the first child element 122a and not the second child element 122b) while decreasing the opacity of the first child element 122a (e.g., the first subset of frames 510). In some examples, the crossfade module 114 increases the opacity of the second child element 122b (and the second subset of frames 512) while maintaining the container 120 in the second state. That is, the GUI 104 includes display of the container 120 in the second state (e.g., display of the second child element 122b and not the first child element 122a) while increasing the opacity of the second child element 122b (e.g., the second subset of frames 512).

In some examples, the computing device 102 can insert (or add) an empty frame 610 within the sequence of the crossfaded frames 602. The computing system 102 can insert the empty frame 610 at a middle/center of the sequence of the crossfaded frames 602. When converting a previously created transition (e.g., as illustrated by FIG. 4), the empty frame 610 replaces (or takes the place of) the removed frames 410, or a least a portion of the removed frames 410. When creating a new condensed transition between two states, the empty frame 610 can separate frames of the two different states (e.g., be located between a frame of the beginning state and a frame of the ending state). The empty frame 610 can be void of any displayable content.

In some examples, referring to FIG. 4, the computing device 102 determines a shape and a position of the first frame 404 as a first graphical representation of the container 410 and determines a shape and a position of the last frame 406 as a second graphical representation of the container 410. Further, the computing device 102 applies the transition to the container 410 by morphing the first graphical representation of the container 410 into the second graphical representation of the container 410 for the condensed transition. For example, the child elements 122 are represented by respective frames (of the frames 402) in the container 410, and applying the transition to the container includes morphing the shape and the position of the respective frames in the container 410 in the first state to the shape and the position of the respective frames in the container 410 in the section state in the condensed transition.

In some implementations, after the computing device 102, and specifically, the transition module 110, applies the transition to the container 120, the computing device 102 provides for display the container 120 on the GUI 104 in the second state, as illustrated in FIG. 3. That is, the presentation of the container 120 includes the second child element 122b, and does not include the first child element 122a.

Figure 7:
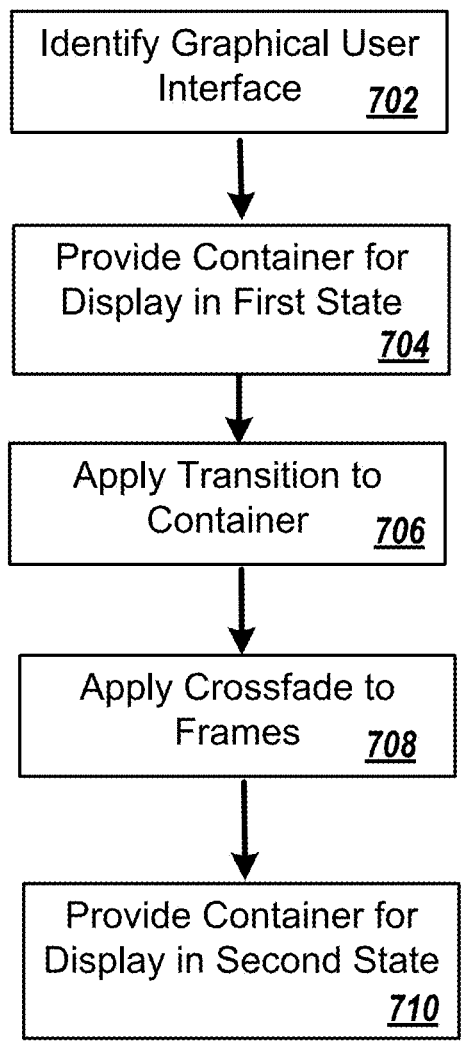
FIG. 7 is a flowchart of an example process of providing a condensed transition of graphical elements of the GUI.

FIG. 7 illustrates an example process 700 for providing condensed transitions of graphical elements. The process 700 can be performed, for example, by the computing device 102, or another data processing apparatus. The process 700 can also be implemented as instructions stored on a computer storage medium, and execution of the instructions by one or more data processing apparatus cause the one or more data processing apparatus to perform some or all of the operations of the process 700.

The computing device 102 identifies the graphical user interface (GUI) 104 (702). In some examples, the GUI 104 includes the container 120 that has the first child element 122a and the second child element 122b. The container 120 defines the grouping of child elements 122 and relationships between the child elements 122. The computing device 102 provides for display the container 120 on the GUI 104 in a first state (704). In some examples, the first state of the container 120 includes display of the first child element 122a and not the second child element 122b. As show in FIG. 2, the computing device 102 provides for display the container 120 in a first state, the first state including display of the first child element 122a, but not the second child element 122b. The transition module 110 applies a transition to the container 120 to effectuate a state change of the container 120 from the first state to the second state (706). In some examples, the second state includes display of the second child element 122b and not the first child element 122a.

The crossfade module 114 applies a crossfade to the container 120 to graphically fade the first child element 122a to the second child element 122b during application of the transition to the container 120 (708). Specifically, the crossfade module 114 applies a crossfade to the container 120, and specifically, to the condensed plurality of frames 502 to define the crossfaded frames 602 as the container 120 moves within the user interface. In some examples, the crossfade module 114 applies the crossfade to the container 120 by adjusting an opacity of the first child element 122a and the second child element 122b as the container 120 moves. This opacity adjustment in combination with the movement of the container creates an animation effect that is visually perceived in a manner similar to that provided by a direct transition, but without requiring the processing to perform the direct transition. The computing device 102 provides for display, after applying the transition, the container 120 on the GUI 104 in the second state (710). That is, after the transition is applied, the container 120 presents the second child element 122b, but does not present the first child element 122a.

In some implementations, an existing transition (e.g., a direct transition similar to that shown in FIG. 4) can be converted to a condensed transition. In these implementations, the transition module 110 identifies the plurality of frames 402 that are included in the transition of the container 120 from the first state to the second state. The plurality of frames 402 represent a sequence of frames that are displayed in a particular sequence of frames between the first state and the second state. The computing device 102 can remove some of the frames (e.g., frames 410) from the plurality of frames 402 to provide a condensed transition of the container 120 (710). Specifically, the computing device 102 can remove frames from the plurality of frames 402 to provide the condensed transition of the container from the first state to the second state using fewer frames than is required by the full direct transition. The crossfade discussed above can also be applied to the remaining frames.

Figure 8:
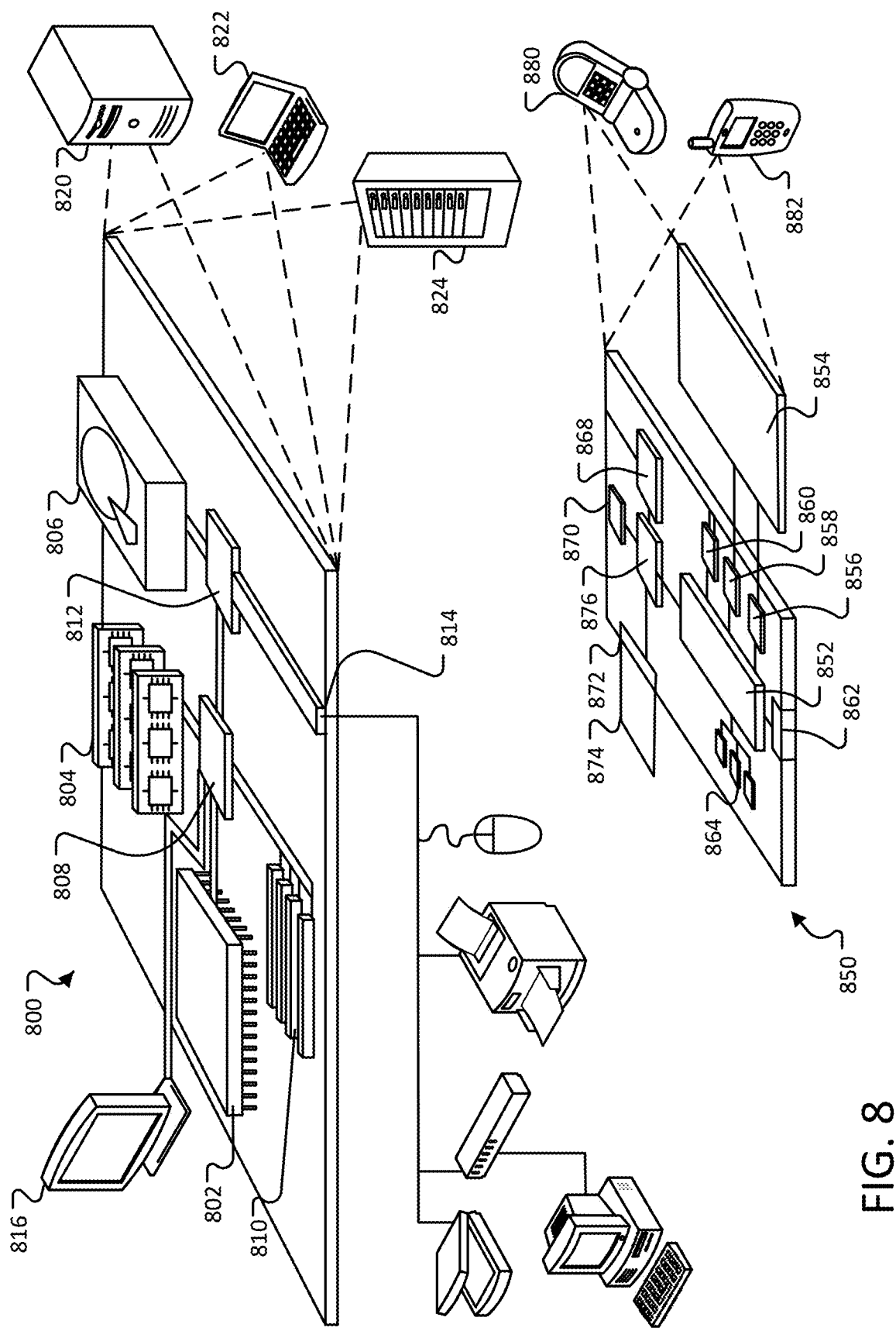
FIG. 8 depicts an example computing system that may be used to implement the techniques described herein.

FIG. 8 shows an example of a generic computer device 800 and a generic mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 may process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 804, the storage device 806, or a memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 may execute instructions within the computing device 840, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 848 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 may be implemented as one or more of a computer-readable medium or media, a volatile memory unit or units, or a non-volatile memory unit or units. Expansion memory 854 may also be provided and connected to device 850 through expansion interface 852, which may include, for example, a SIMM (Single In Line Memory Module) card interface. Such expansion memory 854 may provide extra storage space for device 850, or may also store applications or other information for device 850. Specifically, expansion memory 854 may include instructions to carry out or supplement the processes described above, and may include secure information also. Thus, for example, expansion memory 854 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 854, memory on processor 852, or a propagated signal that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 850 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method, comprising
identifying a graphical user interface including a container having a first child element and a second child element;
providing for display the container on the graphical user interface in a first state, the first state including display of the first child element, but not the second child element;
applying a transition to the container to effectuate a state change of the container from the first state to a second state as the container moves within the graphical user interface, the second state including display of the second child element, but not the first child element, applying the transition including applying a crossfade to the container to graphically fade between the first child element and the second child element as the container moves within the graphical user interface, wherein the transition to the container provides an animation that is visually perceived as a direct transition between the first child element and the second child element independent of an interpolation process that morphs the first child element into the second child element; and
after applying the transition, providing the container for display within the graphical user interface in the second state.

2. The computer-implemented method of claim 1, wherein applying the crossfade to the container to graphically fade the first child element to the second child element includes adjusting an opacity of the first child element and the second child element.

3. The computer-implemented method of claim 2, wherein adjusting the opacity of the first child element and the second child element includes decreasing the opacity of the first child element and increasing the opacity of the second child element during application of the crossfade.

4. The computer-implemented method of claim 3, wherein application of the transition to the container includes maintaining the container in the first state while decreasing the opacity of the first child element.

5. The computer-implemented method of claim 4, wherein application of the transition to the container includes maintaining the container in the second state while increasing the opacity of the second child element.

6. The computer-implemented method of claim 1, wherein each child element is represented by a respective frame in the container and wherein applying the transition to the container includes replacing the frame in the container in the first state with the frame in the container in the second state through a change in opacity of the frames.

7. A system comprising:
one or more computers and one or more storage devices storing instructions that are operable, when executed by the one or more computers, to cause the one or more computers to perform operations comprising:
identifying a graphical user interface including a container having a first child element and a second child element;
providing for display the container on the graphical user interface in a first state, the first state including display of the first child element, but not the second child element;
applying a transition to the container to effectuate a state change of the container from the first state to a second state as the container moves within the graphical user interface, the second state including display of the second child element, but not the first child element, the applying the transition including applying a crossfade to the container to graphically fade between the first child element and the second child element as the container moves within the graphical user interface, wherein the transition to the container provides an animation that is visually perceived as a direct transition between the first child element and the second child element independent of an interpolation process that morphs the first child element into the second child element; and
after applying the transition, providing the container for display within the graphical user interface in the second state.

8. The system of claim 7, wherein applying the crossfade to the container to graphically fade the first child element to the second child element includes adjusting an opacity of the first child element and the second child element.

9. The system of claim 8, wherein adjusting the opacity of the first child element and the second child element including decreasing the opacity of the first child element and increasing the opacity of the second child element during application of the crossfade.

10. The system of claim 9, wherein application of the transition to the container includes maintaining the container in the first state while decreasing the opacity of the first child element.

11. The system of claim 10, wherein application of the transition to the container includes maintaining the container in the second state while increasing the opacity of the second child element.

12. The system of claim 7, wherein each child element is represented by a respective frame in the container and wherein applying the transition to the container includes replacing the frame in the container in the first state with the frame in the container in the second state through a change in opacity of the frames.

13. A non-transitory computer-readable medium storing software comprising instructions executable by one or more computers which, upon such execution, cause the one or more computers to perform operations comprising:

identifying a graphical user interface including a container having a first child element and a second child element;

providing for display the container on the graphical user interface in a first state, the first state including display of the first child element, but not the second child element;

applying a transition to the container to effectuate a state change of the container from the first state to a second state as the container moves within the graphical user interface, the second state including display of the second child element, but not the first child element, the applying the transition including applying a crossfade to the container to graphically fade between the first child element and the second child element as the container moves within the graphical user interface, wherein the transition to the container provides an animation that is visually perceived as a direct transition between the first child element and the second child element independent of an interpolation process that morphs the first child element into the second child element; and after applying the transition, providing the container for display within the graphical user interface in the second state.

14. The computer-readable medium of claim 13, wherein applying the crossfade to the container to graphically fade the first child element to the second child element includes adjusting an opacity of the first child element and the second child element.

15. The computer-readable medium of claim 14, wherein adjusting the opacity of the first child element and the second child element including decreasing the opacity of the first child element and increasing the opacity of the second child element during application of the crossfade.

16. The computer-readable medium of claim 15, wherein application of the transition to the container includes maintaining the container in the first state while decreasing the opacity of the first child element.

17. The computer-readable medium of claim 16, wherein application of the transition to the container includes maintaining the container in the second state while increasing the opacity of the second child element.

18. The computer-readable medium of claim 13, wherein each child element is represented by a respective frame in the container and wherein applying the transition to the container includes replacing the frame in the container in the first state with the frame in the container in the second state through a change in opacity of the frames.

* * * * *